Sept. 15, 1925.
H. L. MERRICK
WEIGHING MECHANISM
Filed Oct. 26, 1921
1,553,788
2 Sheets-Sheet 2
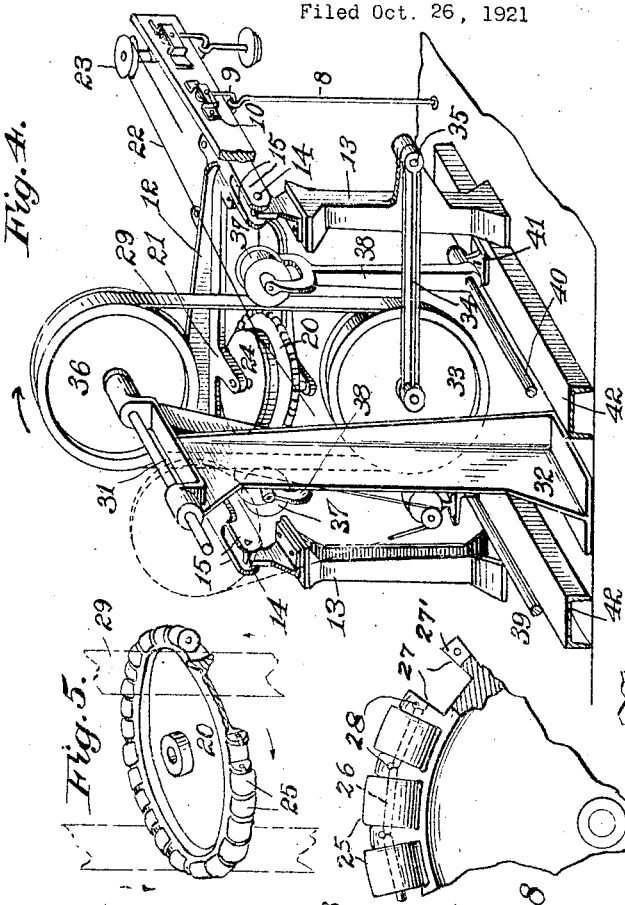
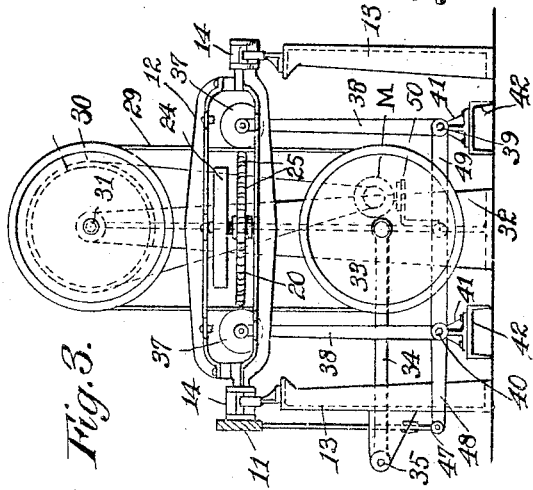
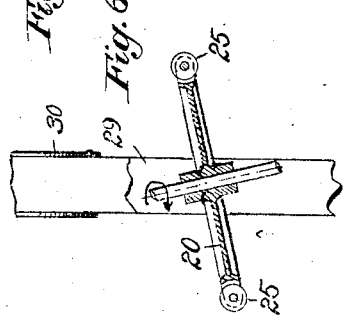
Inventor
Herbert L. Merrick
By his Attorney Patented Sept. 15, 1925.

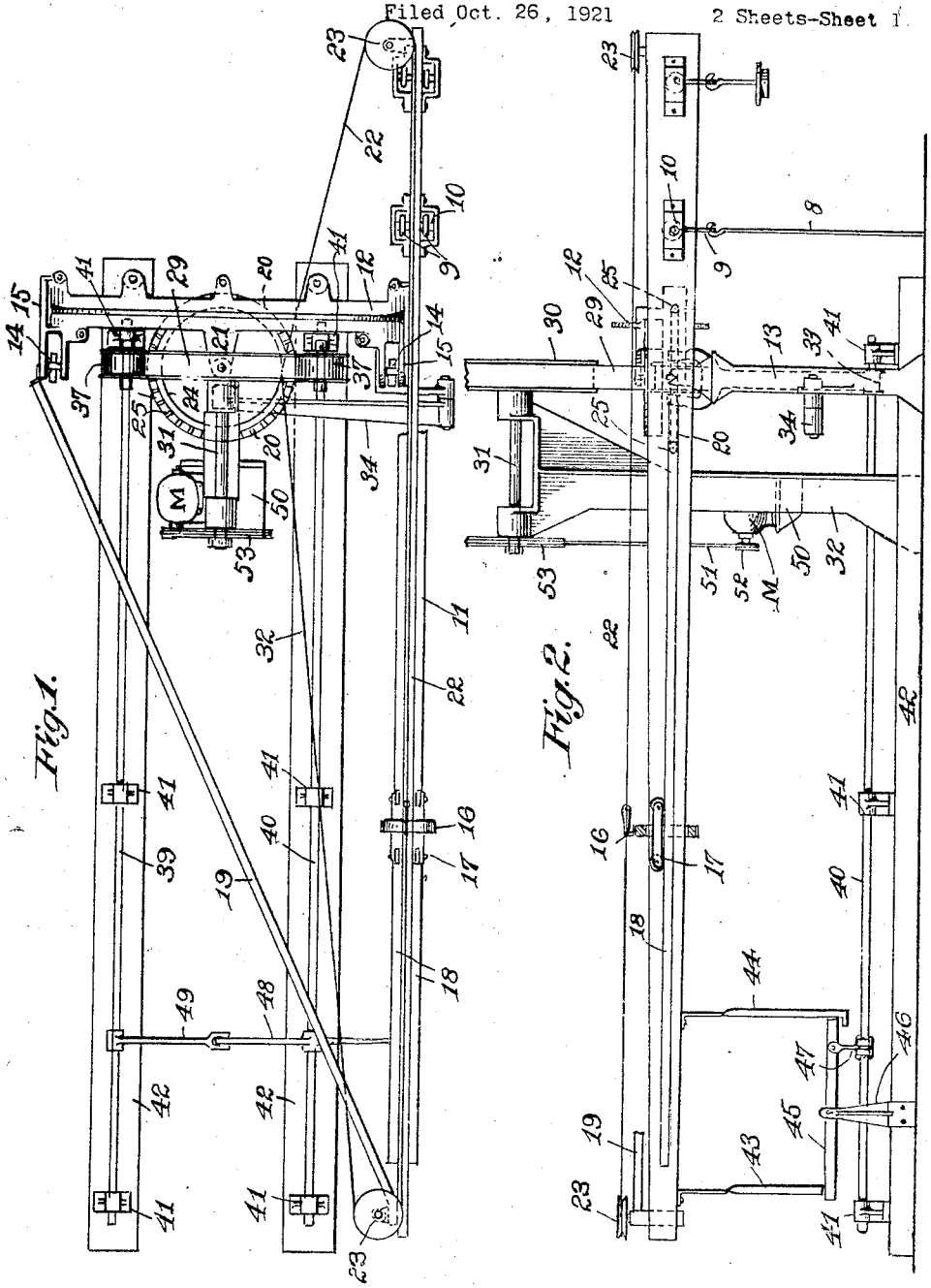

1,553,788

UNITED STATES PATENT OFFICE.

HERBERT L. MERRICK, OF PASSAIC, NEW JERSEY.

WEIGHING MECHANISM.

Application filed October 26, 1921. Serial No. 510,454.

*To all whom it may concern:*

Be it known that I, HERBERT L. MERRICK, a citizen of the United States, and a resident of Passaic, in the county of Passaic and State of New Jersey, have invented certain new and useful Improvements in Weighing Mechanism, of which the following is a specification.

This invention relates to weighing mechanism employing a steel yard or scale beam arranged to be influenced by a load being weighed and in which the beam is brought into equilibrium by the adjustment of a poise weight upon the beam to counterbalance a load, said poise weight co-operating with graduations on a scale beam to indicate the weight of a load, and it is the object of the invention to provide improved means controlled by the deflection of the scale beam to automatically adjust the poise weight upon the beam to bring the beam into equilibrium and to counterbalance a load being weighed.

In carrying out the invention I provide a pivotally supported scale beam arranged to have load supporting means connected to one end and having a poise weight adjustably mounted on the other end, a friction driven wheel being mounted upon the beam support to rotate on an axis perpendicular to the longitudinal axis of the beam and in a plane coincident with the pivotal plane of the beam and having a connection with the poise weight to adjust the poise weight through the rotation of said friction wheel, a friction driving surface traveling in a direction parallel with the axis of the driven wheel when the beam is in equilibrium and relative to which the plane of rotation of the wheel is adapted to be varied by and in accordance with the deflection of the scale beam from equilibrium to underload or overload position to rotate and control the direction of rotation of the driven wheel and thereby the adjustment of the poise weight upon the beam.

In the drawings accompanying and forming a part of this specification, Figure 1 is a plan view of weighing mechanism illustrating an embodiment of my invention to automatically adjust the poise weight to bring the weighing mechanism into equilibrium to counterbalance a load being weighed, only so much of the weighing mechanism being shown as is essential to an understanding of the invention.

Figure 2 is a front elevational view of Figure 1.

Figure 3 is an end elevation looking at the right of Figure 1 with the scale beam in section.

Figure 4 is a perspective view, partly in section, of the means to automatically adjust the poise weight when the weighing mechanism is moved out of equilibrium to bring the mechanism in position to counterbalance or weigh a load.

Figure 5 is a perspective detail view showing in a diagrammatic manner the relation of the driven friction wheel of the poise weight adjusting means in relation to the friction driving surface therefor.

Figure 6 is a detail sectional view to illustrate in a diagrammatic manner the angular position to which the friction driven wheel is changed relative to the friction driving surface when the beam is moved to underload position to drive the friction driven wheel to adjust the poise weight to bring the beam into equilibrium.

Figure 7 is a view similar to Figure 6 but showing the angular position to which the friction driven wheel is changed relative to the friction driven surface when the beam is moved to overload position to drive the friction driven wheel in a direction reverse to that shown in Figure 6 and to adjust the poise weight in opposite direction to bring the beam into equilibrium; and Figure 8 is a cross sectional view to show the mounting of rollers upon the periphery of the wheel to rotate on an axis extending circumferentially of the wheel.

Similar characters of reference designate like parts throughout the different views of the drawings.

I have shown in the drawings an embodiment of the invention in connection with a platform scale or weighing mechanism in which a load receiving platform (not shown) is connected by a rod 8 to a shackle 9 for the engagement of knife edge pivots 10 projecting laterally from opposite sides of the scale beam 11. The scale beam is carried by a frame 12 comprising a pair of parallel spaced members connected at opposite ends and pivotally supported upon bearings mounted upon standards 13 by knife edge pivots 14 extending between parallel members 15 rigid with and extending at right angles to the spaced members of the frame 12 and to one of which members the scale beam 12 is fixed between its ends as shown in the drawings, the load receiving platform being connected to the beam at one side of the pivotal support of its carrying frame 12. A poise weight 16 is mounted upon a roller carriage 17 mounted upon tracks 18 at opposite sides of the beam to have to and fro movement along the beam and adjust the poise weight upon the beam. To further support the scale beam a brace 19 (Figure 1) is fixed at one end to the end of the beam carrying frame 12 to extend diagonally therefrom and fixed at its opposite end to the end of the scale beam. The scale beam is arranged with graduations with which the poise weight co-operates to indicate the weight of the load.

To adjust the poise weight 16 upon the scale beam to bring the weighing mechanism into equilibrium to counter-balance a load, or to bring the beam to initial position of equilibrium when the load is removed, a friction driven disk 20 is mounted between lugs 21 projecting laterally from the members of the beam supporting frame 12 to rotate on an axis perpendicular to the longitudinal axis of the scale beam and intersecting the pivotal support of the beam and in a plane with the pivotal plane of the scale beam. This disk is operatively connected to the poise weight whereby as the disk is rotated longitudinal movement will be imparted to the poise weight to adjust the latter upon the beam, this connection in the present instance comprising a belt or cable 22 connected at opposite ends to the poise weight, as shown in Figures 1 and 2, passing around pulleys 23, supported at opposite ends of the scale beam to rotate on axes perpendicular to the longitudinal axis of the beam, and looped around a wheel or sheave 24 rotatable with the disk 20.

A series of rollers 25 (Figures 5 to 8) is disposed around the periphery of the disk 20 and rotatable on an axis extending circumferentially around the periphery of the disk. For this purpose the rollers are mounted on pivot pins or studs 26 in recesses 27 in the periphery of the disk, the ends of the pins engaging in slots 27' in the end walls of the adjacent recesses 27 and retained therein by pins or screws, as shown at 28. The rollers are of a size to extend beyond the sides and periphery of the disk and are somewhat tapered toward each end so that the outline of all of the rollers substantially coincides with the circumscribed periphery of the disk. The disk 20 is rotated by a traveling friction surface and shown as comprising a belt 29 passing around a pulley 30 fixed to a shaft 31 journalled in a standard 32 and around a pulley 33 rotatably carried at one end of an arm 34 pivotally supported at the opposite end to one of the standards 13, as shown at 35, whereby the pulley 33 is supported by the belt and the weight of said pulley serves to maintain the weight of the belt taut. It will be noted that the pulley 30 is located above and the pulley 33 below the disk 20 and are so arranged that the oppositely moving stretches of the belt engage at diametrically opposite points of the disk and to travel in a plane to coincide with the axis of the disk when the scale beam is in equilibrium. In this position of the disk the frictional contact of the belt with a roller at opposite sides of the disk will rotate such rollers without imparting any rotative movement to the disk. As the scale beam is deflected or moved out of equilibrium the friction driven disk 20 will participate in the movement of the beam with the result that the plane of rotation of the disk, or the axis of rotation of such disk, is varied in angular relation to the plane of travel of the belt and the force of the movement of the belt will impart an axial thrust to the rollers with which the belt is in contact and will impart rotative movement to the disk in the direction of such thrust and such movement of the disk is transmitted to the poise weight through the belt 22 moving the poise weight along the beam. The angular relation of the disk to the belt is changed by and in accordance with the movement or deflection of the scale beam out of equilibrium to overload or underload position. The poise weight in its normal position is adjacent to the pivotal support of the beam. Assuming a load to have been imposed upon the weighing mechanism and the graduated end of the scale beam is moved upward varying the angular relation of the disk to the belt, as shown in Figure 7, with the belt travelling in the direction indicated by the arrow moving the poise weight outward on the beam. As the beam is gradually brought to counterbalancing position or equilibrium by such movement of the poise weight the angular relation of the disk to the belt will be gradually changed until the disk will be in position to rotate on an axis in a plane with the direction of travel of the belt and no further movement imparted to the disk. As the load is removed from the weighing mechanism due to the adjustment of the poise weight outward on the beam such poise weight carrying end of the beam will move downward changing the angular relation of the disk 20 to the belt as diagrammatically shown in Figure 6 when the belt will exert an axial force upon the rollers 25 to rotate the disk in the direction indicated by the arrow in said Figure 6 and reverse so that when the disk is adjusted to the position shown in Figure 7 thereby moving the poise weight in an opposite direction on the beam and toward the pivotal support thereof to position to bring the beam into initial position of equilibrium.

To cause the belt to positively engage the rollers 25 and rotate the disk 20 when the beam is moved out of equilibrium means are provided to forcibly press the belt against the rollers 25. For this purpose rollers 37 are rotatably mounted in the bifurcated ends of arms 38 to engage the outer surface of the belt at opposite sides of the disk. These arms are fixed to rock shafts 39, 40 extending longitudinally of the scale beam and rotatably supported in brackets 41 mounted upon members 42 or channel shape in cross section. These shafts are rocked in a direction toward each other to move the roller carrying arms 38 inward toward the opposite stretches of the belt by means actuated by either one of a pair of arms 43, 44 fixed to and extending downward from adjacent the outer end of the scale beam with the free end of one arm, as 43, to engage above one end of a lever 45 pivotally supported by a bracket 46 fixed upon a member 42, and the other arm 44 having the end bent laterally to extend below the opposite end of the lever 45. This lever is connected at one side of its pivotal support by a link 47 to one end of a lever 48 fixed to the shaft 40 the other end of the lever 48 being pivotally connected to an arm 49 fixed to the shaft 39. It will be obvious that as the beam is moved downward or to underload position that the arm 43 will engage the lever 45 moving the link 47 and the connected end of the arm 48 upward thereby rocking the shafts 39, 40 to move the rollers 37 inward into forcible engagement with the belt and the pressure with which the rollers 37 will engage the belt will be gradually diminished as the beam gradually comes into position of equilibrium by the adjustment of the poise weight thereon. When the beam is moved upward or to overload position as by the imposing of a load upon the weighing mechanism the lateral projection of the arm 44 engaging below the one end of lever 45 will move said lever in the same direction as the arm 43 rocking the shafts 39, 40 to move the rollers 37 into engagement with the belt.

The friction driving surface 29 is continuously driven from a suitable source of power, and as shown is driven by an electric motor (designated in a general way by M) mounted upon a bracket 50 fixed to the standard 32, and operatively connected to the friction driving surface through a belt 51 passing around a pulley 52 on the motor shaft and a pulley 53 fixed to the shaft 31.

It will be obvious that the poise weight need not be first returned to position to bring the scale beam to initial position of equilibrium before the successive load may be weighed, but that a successive load may be applied to the weighing mechanism as a load previously weighed is removed whether such successive load is of greater or less weight than such previous load.

It will also be noted that the poise weight is adjustable upon the beam to counterbalance a load being weighed in a manner similar to that of ordinary hand weighing, but that the poise weight is automatically moved to correct counterbalancing position, and that when the load is removed from the weighing mechanism the poise weight is automatically adjusted to bring the scale beam into initial no-load position.

Having thus described my invention I claim:

1. In weighing mechanism, the combination with a scale beam arranged with load supporting means, of a poise weight adjustable on the beam, a travelling member having a friction surface; and a rotatable member to contact with the friction surface of said travelling member operative to adjust the poise weight through the rotation of said rotatable member, said rotatable member being normally positioned to rotate on an axis parallel with the direction of travel of the friction traveling member when the beam is in equilibrium and the axis of rotation of said rotatable member being adapted to be varied in angular relation to the plane of travel of the traveling friction member by and in accordance with the deflection of the beam to underload and overload position to rotate and control the direction of rotation of said rotatable member and the adjustment of the poise weight upon the beam.

2. In weighing mechanism, the combination with a scale beam arranged with load supporting means, of a poise weight adjustable on the beam to counterbalance a load supported by the beam; a travelling belt; a rotatable friction member having an operative connection with the poise weight to adjust said weight through the rotation of the friction member, said member normally rotating on an axis in line with the direction of travel of the belt when the beam is in equilibrium and the axis of rotation of said member being adapted to be varied in angular relation to the travel of the belt by and in accordance with the direction of deflection of the beam to rotate and control the direction of rotation of said rotatable member and thereby the adjustment of the poise weight upon the beam for the purpose specified.

3. In weighing mechanism, the combination with a scale beam arranged to support a load therefrom, of a poise weight adjustable on the beam to counterbalance a load supported thereby; a rotable friction member having an operative connection with the poise weight to adjust said weight upon the beam through the rotation of said friction member; and a traveling belt arranged with oppositely moving stretches to frictionally engage said rotatable member for the purpose specified.

4. In weighing mechanism, the combination with a scale beam, of a poise weight adjustable on the beam to counterbalance the load being weighed; a member having a friction surface traveling in a constant direction; a friction member normally positioned to rotate on an axis parallel with the direction of travel of the friction surface of the first member when the beam is in equilibrium, and the axis of rotation of said rotatable member being adapted to be varied in angular relation to the travel of the first friction member by and in accordance with the direction of the deflection of the beam to rotate and control the direction of rotation of said rotatable friction member; and means to operatively connect the rotatable friction member to the poise weight to adjust the same upon the beam through the rotation of said friction member.

5. In weighing mechanism, the combination with a scale beam, of a poise weight adjustable on the beam to counterbalance a load being weighed; a traveling belt; a friction driven wheel connected to the beam in all positions of the latter and arranged to be frictionally engaged by opposite stretches of the belt, said wheel being adapted to rotate on an axis parallel with the direction of travel of the belt when the beam is in equilibrium with the wheel maintained inactive, and on an axis at varying angular relation to the direction of travel of the belt by and in accordance with the direction of deflection of the beam to rotate and control the direction of rotation of the wheel; and means to operatively connect the wheel to the poise weight to transmit the rotative movement of the wheel to said weight for the purpose specified.

6. In weighing mechanism, the combination of a scale beam supporting frame; a poise weight adjustable on the beam to counterbalance a load being weighed; a friction wheel carried by said frame to rotate in a plane coincident with the plane of the beam; a traveling surface to frictionally engage the wheel; said wheel when the beam is in equilibrium having its plane of rotation at right angles to the direction of travel of said surface and the wheel maintained inactive, and the angle between the plane of rotation of said wheel and direction of travel of the surface being adapted to be varied by and in accordance with the direction of deflection of the beam to frictionally rotate the said wheel from said surface and control the direction of rotation of the wheel; and an operative connection between said wheel and poise weight for the purpose specified.

7. In weighing mechanism, the combination of a pivotally supported frame carrying a scale beam; a poise weight adjustable on the beam to counterbalance a load being weighed; a wheel carried by said frame to rotate on an axis perpendicular to the longitudinal axis of the beam; means to operatively connect said wheel to the poise weight to transmit the rotative movement of said wheel to the poise weight to adjust the same upon the beam; and a belt arranged with the oppositely moving stretches to frictionally engage said wheel for the purpose specified.

8. In weighing mechanism, the combination of a pivotally supported scale beam; a poise weight adjustable on the beam to counterbalance a load being weighed; a rotatable friction wheel; a belt arranged with the oppositely moving stretches thereof at opposite peripheral portions of the wheel; means operative by the deflection of the beam to maintain said belt in engagement with the wheel to frictionally rotate the latter; and means to connect the wheel to the poise weight to transmit the rotative movement of said wheel to the poise weight to adjust the same upon the beam.

9. In weighing mechanism, the combination of a scale beam; a poise weight adjustable on the beam to counterbalance a load being weighed; a rotatable disk; a belt with oppositely moving stretches arranged to engage at opposite peripheral portions of the disk and traveling in a direction coincident with the axis of the disk when the beam is in equilibrium; a series of rollers disposed around the periphery of the disk to rotate on an axis extending circumferentially of the disk, said rollers adapted to be frictionally rotated by the belt when the beam is in equilibrium without imparting movement to the disk and adapted to have axial thrust imparted thereto by the movement of the belt and rotate the disk when the beam is deflected causing a change in the angular relation between the axis of the disk and belt; and means to impart the rotary movement of the disk to the poise weight for the purpose specified.

10. In weighing mechanism, the combination of a pivoted scale beam; a poise weight adjustable on the beam to counterbalance a load being weighed; a friction driven disk carried by the beam; a belt to frictionally rotate said disk; a wheel rotatable with the disk; and a belt passing around said wheel and wheels rotatably carried at opposite ends of the beam and connected to the poise weight to impart the rotative movement of the disk to said weight to adjust the same longitudinally upon the beam for the purpose specified.

11. In weighing mechanism, the combination of a scale beam, a frame carrying said beam supported to have movement on an axis extending transversely of the scale beam, a poise weight adjustable along the beam, a friction driven disk mounted in said frame to rotate on an axis intersecting the axis of the frame, continuously driven friction means to frictionally engage said disk without imparting movement thereto when the beam is in equilibrium and adapted to rotate the disk when the beam is moved out of equilibrium, and a connection between said disk and poise weight to adjust the latter along the beam when the disk is rotated for the purpose specified.

12. In weighing mechanism, the combination of a pivotally supported scale beam; a poise weight adjustable upon the beam; a rotatable friction driven disk rotatable in a plane parallel with the beam in all positions thereof; constantly driven friction means to frictionally engage and rotate said disk when the beam is moved out of equilibrium; and a connection between said disk and poise weight for the purpose specified.

13. In weighing mechanism, the combination of a scale beam; a poise weight adjustable on the beam to counterbalance a load being weighed; a rotatable friction disk; means to connect said disk to the poise weight to adjust the latter upon the beam through the rotation of the disk; a belt with the opposite stretches arranged at opposite peripheral portions of the disk; and means operative when the beam is moved out of equilibrium to force said belt into frictional engagement with the disk to rotate the disk for the purpose specified.

14. In weighing mechanism, the combination of a scale beam; a poise weight adjustable on the beam to counterbalance a load being weighed; a rotatable friction disk; means to connect said disk to the poise weight to adjust the latter upon the beam through the rotation of the disk; a belt with the oppositely moving stretches arranged at opposite peripheral portions of the disk; rocker arms carrying rollers to engage at the outer surface of the belt; and means operative when the beam is moved out of equilibrium to rock said arms to force the belt into frictional engagement with the disk for the purpose specified.

15. In weighing mechanism, the combination of a scale beam; a poise weight adjustable on the beam to counterbalance a load being weighed; a rotatable friction disk; means to connect said disk to the poise weight to adjust the latter upon the beam through the rotation of the disk; a belt with the opposite stretches arranged at opposite peripheral portions of the disk; rocker arms carrying rollers to engage at the outer surface of the belt; a lever having a connection with said rocker arms; and abutments carried by the beam arranged when the beam is moved out of equilibrium to actuate said lever to rock the arms to force the belt into frictional engagement with the disk to rotate the same for the purpose specified.

16. In weighing mechanism, the combination of a scale beam; a poise weight adjustable on the beam to counterbalance a load being weighed; a rotatable friction disk; means to connect said disk to the poise weight to adjust the latter upon the beam through the rotation of the disk; a belt with the opposite stretches arranged at opposite peripheral portions of the disk; a pair of rocker shafts extending longitudinally of the scale beam; an arm fixed to each of said shafts carrying rollers to engage at opposite sides of the outer surface of the belt; a lever; a second lever fixed to one of the shafts and having a pivotal connection at one end with the one end of the first lever; and an arm fixed on the other shaft having a pivotal connection with the opposite end of the second lever; and a pair of arms fixed to the outer end of the scale beam arranged so that one of said arms when the beam is moved out of equilibrium will engage with the first lever and rock the shafts in opposite directions through the connection thereof with said lever and thereby move the arms to force the belt into frictional engagement with the disk for the purpose specified.

17. In weighing mechanism, a scale beam; poise weight adjustable on the beam to counterbalance a load being weighed; a member having a friction surface traveling in a constant direction; a rotatable friction member in constant contact with the traveling friction member and having its axis angularly adjustable to the direction of travel of the traveling friction surface; and means to connect the rotatable friction member with the poise weight to adjust the poise weight longitudinally on the beam by the rotation of the rotatable friction member.

Signed at city of New York in the county of New York, and State of New York this 21st day of October, 1921.

HERBERT L. MERRICK.